Sheet 2. 2 Sheets.
W. D. Slack.
Self Raker.
N° 88334.    Patented Mar. 30, 1869
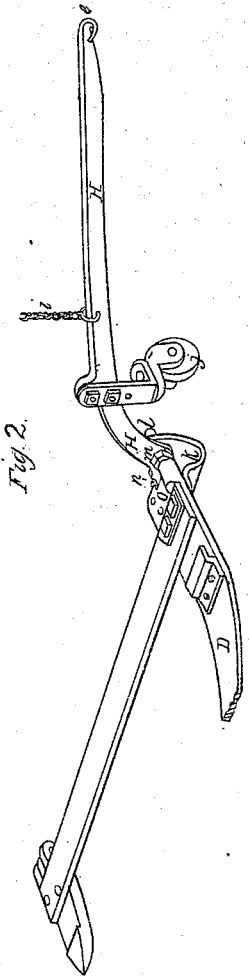
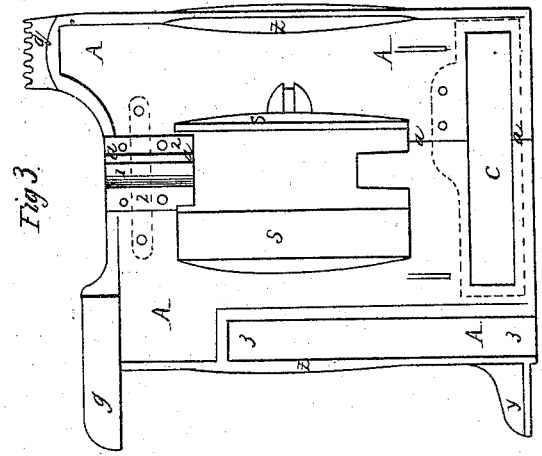
Witnesses:
Jno. D. Patten
Edmund Masson
Inventor:
William D. Slack
By atty A. B. Stoughton

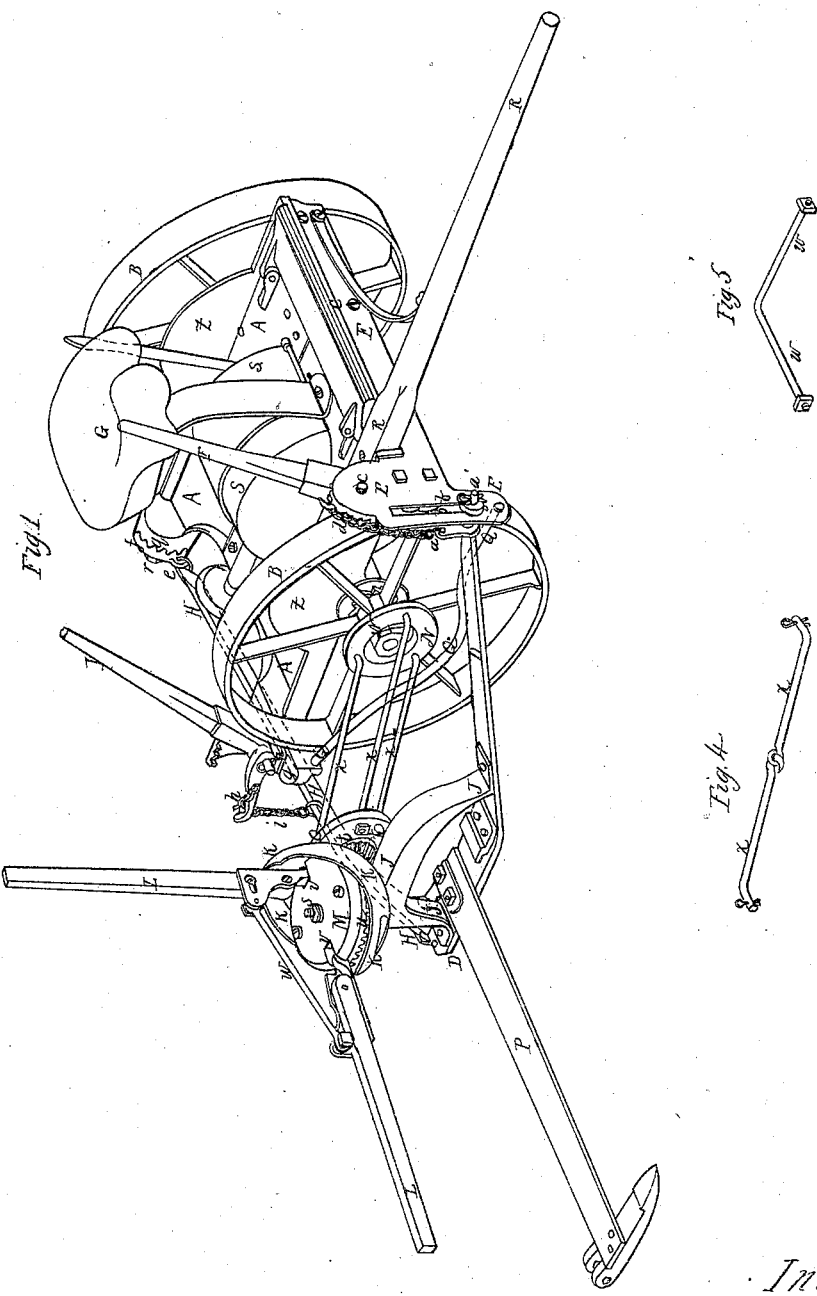

UNITED STATES PATENT OFFICE.

WILLIAM D. SLACK, OF LEWISBURG, PENNSYLVANIA.

IMPROVEMENT IN HARVESTERS.

Specification forming part of Letters Patent No. 88,334, dated March 30, 1869.

*To all whom it may concern:*

Be it known that I, WILLIAM D. SLACK, of Lewisburg, in the county of Union and State of Pennsylvania, have invented certain new and useful Improvements in Harvesting-Machines; and that the following is a full, clear, and exact description of the machine, reference being had to the accompanying drawings, making a part of this specification, in which—

Figure 1 represents in perspective so much of a harvesting-machine and rake therefor, as will illustrate my invention; Fig. 2 represents in perspective a detached portion of the machine, the detail of which is not distinctly seen in Fig. 1. Fig. 3 represents a top plan of the metal frame which I propose to use on my machine. Figs. 4 and 5 represent modifications of parts shown in Fig. 1.

Similar letters of reference where they occur in the separate figures denote like parts of the machine in all of the drawings.

My invention relates to details of construction which will be particularly described; and consists, mainly, in the manner in which I have constructed and arranged the several herein more specifically mentioned parts, so that the machine may be readily converted from a reaper to a mower or vice versa, and the cutter be raised and lowered at front and rear, as will be explained.

To enable others skilled in the art to make and use my invention, I will proceed to describe the same with reference to the drawings.

The main frame A is of cast metal, and though I have shown it as made of two pieces, joined at the lines *a a*, yet it can be cast in one piece, and I so propose to make it. This main frame is supported and carried on the main wheels B B, the axle on which said wheels are placed and turn being supported in suitable journal-boxes underneath said main frame. The main frame A has cast in or with it at its front under part a tool-box, *c*, and has, moreover, upon it suitable projections and recesses for receiving and holding such parts of the machine as are necessarily connected to or supported by the main frame.

The drag-bar D, which carries the cutting apparatus and the raking apparatus, is connected to the main frame at its front by a neck, *a'*, upon it passing through a slot, *b*, in a plate, E, bolted to the front of the main frame. On this plate E is pivoted, at *c*, a lifting-lever, F, from which a chain, *d*, extends down to the front part of said drag-bar. The driver in his seat G, by seizing and operating the lever F, can raise up or let down the front end of the drag-bar or hold it any desired height by throwing the tooth or projection on said lever into, under, or against any one of the ratchet-teeth on said plate E. The rear end of the drag-bar is braced and supported by a brace, H, which is linked, at *e*, to an adjustable plate, *f*, on the rear corner of the main frame farthest from the drag-bar, and a lever, I, pivoted on a projecting portion, *g*, of the main frame, has its arm *h* connected with the brace H by a chain, *i*, so that the driver in his seat G may seize and operate said lever I, and by it raise or lower or hold at any desired position the rear portion of the drag-bar. The finger-bar P and the cutting apparatus being carried on the drag-bar D, are of course raised, lowered, or held by it, in such positions as may be required. There is a caster-wheel, *j*, arranged on the brace H, which very much relieves the strain or twist on the machine when turning it around.

On the rear under part of the drag-bar D there is a shoe, *k*, through which a journal or neck, *l*, on the drag-bar passes; and this neck or journal also passes through a hole in the brace H, there being a washer, *m*, on said neck, that, when moved to one side of the brace or the other, changes the character of the union between the brace and drag-bar, making it a yielding connection when arranged as shown in the drawing, but when the washer *m* is put on the other side of the brace, the notched or shouldered end *n* of the brace passes under the portion *o* of the drag-bar, and in this position the joint is comparatively rigid. The end of the brace H most remote from the drag-bar or shoe thereon has a loop or dead-eye on it, as at *e*, which links into a dead-eye on the adjusting-plate *f*, said plate being toothed or roughened, so as to firmly hold against a similarly roughened surface, *q*, on the corner of the main frame, when the two surfaces are run together by a nut, *r*. By turning the movable plate *f*, the brace is adjusted so as to bring the heel of the drag-bar nearer to or farther from the main frame, and so adjust also the pitman that extends from the crank or wrist wheel to the cutter-bar.

Upon the drag-bar D there is placed a rake and reel supporter, J, to which is attached the camway K, which gives the rake and beater arms L their rising and falling motion as they are rotated around their center of motion $s$ by the bevel-pinion $t$, working into the bevel-gear $u$, attached to the under side of the rake-plate M in slots $v$, in which the rake and beater arms are hinged. The rake-arms L are also connected by links $w$, which causes the dropping of one to help in raising up its mate or fellow. At Fig. 5, the rake-brace is shown as bent in the center and of an elbow form. This brace may be placed in the mold so as to be cast with the rake-plate, or "bench," as it is sometimes termed.

Motion is communicated to the rake-plate and rake or beater-arms from the main driving-wheels B or their axle, turning with the wheels when the machine is advancing, but loose when backing or turning around, as follows: Upon the end of the main axle, and turning with it, there is a disk or wheel, N, and attached to or as a part of the bevel-pinion $t$ there is a disk or wheel, O, and these disks or wheels N O are connected by three connecting-rods, $x\ x\ x$, which may be in one piece each, or linked together, as seen in Fig. 4, so that they may have a degree of flexibility as may be desired. By the use of these connecting-rods $x$ motion is transmitted from the main frame to the rake, with an intervening joint between them, and by positive gearing, as distinguished from belt or chain gearing, which will slacken, slip, or cut by the yielding of the joint between the main frame and the cutting apparatus. The use of more than one connecting-rod between the main drive-wheels or axle and the rake-plate on the hinged drag-bar avoids in a great degree the "dead-point" or "dead-centers," between the two disks or wheels N O, for when one is on the dead-centers the other is off and in an efficient working position. By using three rods the centers are passed without jar or clog of any kind, as but one of them at any time can be on the dead-centers, and two are in their efficient working positions. These rods are not, and need not be, rigidly attached to their disks or wheels, as some little play is necessary to allow the finger-bar P and the cutting apparatus thereon to conform to the surface of the ground or the height at which they are to be carried.

To prevent the plate E, in which the front of the drag-bar is supported, from springing, a brace, Q, extending from the rear of the main frame unites with said plate at its lower end, and thus and there strengthens it. A projection, $y$, is cast on the main frame, to which the plate E is bolted, so that with this projection, together with the brace Q, the front of the drag-bar has a firm support.

On the main frame and with it is cast the recess 3 for the tongue R, the shields S, for the gear-wheels on the axle, the guards $z$ next the wheels, and the recess 1 2, for the axle of the crank-wheel to lie in, and the plate that covers it, and other facilities for adapting it to all the purposes of a main frame.

I have represented the rods $x$ as connected to and operating a rake located at the rear of the machine. They are equally applicable to the driving of a rake or beaters at the front of the machine, or to what are termed "rear or front cut" machines.

Having thus fully described my invention, what I claim therein as new, and desire to secure by Letters Patent, is—

1. In combination with the drag-bar and brace, arranged as described, the neck and washer, so that the connection between the two may be made rigid or flexible, as desired, by simply shifting said washer from one side to the other of said brace, as set forth.

2. In combination with the drag-bar and brace and a lifting-lever, I, for raising them, a caster-wheel, $j$, on the brace, to take the strain from the drag-bar and brace and facilitate the turning around of the machine, substantially as described.

3. In combination with a brace for bracing the heel of the drag-bar that carries a cutting apparatus, the link or loop $e$ and adjustable plate $f$, into which it is hooked, for the purpose of drawing the drag-bar nearer to or moving it farther from the main frame, and thus adjust, without detaching or altering, the pitman, substantially as described.

4. The use of two or more connecting-rods between the main driving-wheels or axle and the rake-gears, so as to transmit motion to the rake or beater arms across the flexible connection between the frame and the drag-bar, substantially as and for the purpose described.

5. In combination with the cast frame A and the plate E attached thereto, the brace Q, extending from the rear of the main frame to said plate, as and for the purpose described.

WILLIAM D. SLACK.

Witnesses:
R. CARKHUFF,
W. O. DONOCHY.